US006307164B1

(12) United States Patent
Campbell

(10) Patent No.: US 6,307,164 B1
(45) Date of Patent: Oct. 23, 2001

(54) PNEUMATIC LOAD MEASURING DEVICE FOR VEHICLES

(76) Inventor: Sidney R. Campbell, Right Weigh Inc., 9945 SW. Hall Blvd., Tigard, OR (US) 97223

( * ) Notice: Subject to any disclaimer, the term of this patent is extended or adjusted under 35 U.S.C. 154(b) by 0 days.

(21) Appl. No.: 09/549,573

(22) Filed: Apr. 14, 2000

Related U.S. Application Data

(63) Continuation-in-part of application No. 09/176,308, filed on Oct. 22, 1998.
(60) Provisional application No. 60/067,773, filed on Dec. 10, 1997.

(51) Int. Cl.[7] .......................... G01G 19/10; G01G 21/28; G01G 23/01
(52) U.S. Cl. .............................. 177/141; 177/238; 73/1.13
(58) Field of Search ................................... 177/141, 208, 177/209, 254, 180, 181, 238; 73/1.62, 1.13

(56) References Cited

U.S. PATENT DOCUMENTS

| 3,871,490 | * | 3/1975 | Davis et al. ............................. 177/10 |
| 3,910,365 | | 10/1975 | Buchele ................................. 177/208 |
| 3,929,022 | * | 12/1975 | Ocken, Jr. et al. ................. 116/129 A |
| 4,055,141 | * | 10/1977 | Homs ................................. 116/129 A |
| 4,733,564 | | 3/1988 | Georgé ................................. 73/715 |
| 4,792,004 | | 12/1988 | Sheffield .............................. 177/141 |
| 4,832,141 | | 5/1989 | Perini et al. .......................... 177/141 |
| 4,854,407 | | 8/1989 | Wagner ................................. 177/141 |
| 5,170,856 | | 12/1992 | Yang ................................... 177/209 |
| 5,179,856 | | 1/1993 | Huang .................................. 73/74 R |
| 5,349,866 | | 9/1994 | Huang .................................. 73/727 |
| 5,391,843 | | 2/1995 | Sato et al. ............................ 177/141 |
| 5,555,764 | | 9/1996 | Dybas ................................. 73/296 |
| 5,844,474 | | 12/1998 | Saling et al. ......................... 177/141 |
| 6,055,925 | * | 5/2000 | Horton ................................. 116/34 R |

* cited by examiner

Primary Examiner—Randy W. Gibson
(74) Attorney, Agent, or Firm—Richard C. Litman

(57) ABSTRACT

A pneumatic load measuring device for vehicles having pneumatic or air suspension systems includes a pneumatic pressure gauge calibrated to indicate the weight of the vehicle. The gauge is installed in the cab of the vehicle, where it is visible to the vehicle operator, and is connected to the pneumatic suspension system of the vehicle. The gauge may be calibrated to indicate the weight of the vehicle supported by the air suspension system, either in pounds or using the metric system. The gauge may be marked to indicate the maximum allowable weight of the vehicle, if desired, and an adjustable scale may be provided for the cargo weight. The zero point of the adjustable cargo weight scale is positioned opposite the empty weight of the vehicle, so both the cargo weight and total vehicle weight are displayed on a single gauge. A visible and/or audible annunciator may be provided to indicate when the maximum allowable weight of the vehicle has been reached during loading of the vehicle. Alternatively, an electric gauge may be used in place of the pneumatic gauge. The electric gauge is connected to the pneumatic suspension system for measuring the load weight on the vehicle via a pressure to electric (e.g., voltage) transducer.

8 Claims, 7 Drawing Sheets

PNEUMATIC LOAD MEASURING DEVICE FOR VEHICLES

CROSS REFERENCE TO RELATED APPLICATIONS

This application is a continuation-in-part of application Ser. No. 09/176,308, filed Oct. 22, 1998, which claims the benefit of U. S. Provisional Patent Application Ser. No. 60/067,773, filed on Dec. 10, 1997.

BACKGROUND OF THE INVENTION

1. Field of the Invention

The present invention relates generally to instrumentation for measuring the weight of an object, and more specifically to a pneumatic device for weighing a truck having a pneumatic suspension system. The device comprises a pneumatic pressure gauge calibrated to show the weight of the trailer, and connected to the pneumatic suspension system of the trailer and/or tractor.

2. Description of the Related Art

The trucking industry is a vital part of the U.S. economy, and as such, thousands of trucking companies, ranging from small, local single truck operators to larger interstate operations having hundreds of trucks, have been formed. Such trucking operations are heavily regulated, due to the size and weight of the vehicles used. Some of the most critical regulations in the trucking industry relate to the maximum allowable loaded weight of the truck. Most, if not all, states have developed regulations relating to the maximum allowable weight of trucks and other vehicles used in commercial operations within each state. These regulations are of sufficient importance, that it is difficult to find a major stretch of U.S. highway more than two hundred miles or so in length, without truck weight scales.

Truck weight is of importance for several reasons, such as licensing revenue, etc. However, safety is a much more important concern. Limits are placed upon truck weight due to highway and bridge weight bearing capacities, and also for the well known reason that the heavier a vehicle is, the more difficult it is to maneuver and stop that vehicle. Generally, most states place a maximum limit of about 72,000 pounds total weight for a fully loaded "eighteen wheeler" semi-truck tractor and trailer, but this may vary from state to state, and may even vary within a state depending upon the type of truck and/or cargo being carried.

To this point, the only means truckers have of determining the fully loaded weight of their trucks, is by driving the truck onto a truck scale. Practically all trucking companies have such scales, but they are of no use when a truck is sent out empty to pick up a load at another location. At that point, the only recourse a trucker has is to know the empty weight of his truck and trailer, and trust that the cargo manifest is correct.

What is needed is a simple and inexpensive means for a truck driver to determine the weight of the loaded truck and trailer combination, easily and quickly. While at least one other device has been developed for installing within a vehicle for determining the weight of the vehicle (as discussed further below in the discussion of the related art), that device is exceedingly complex and costly. A discussion of the related art of which the present inventor is aware, and its differences and distinctions from the present invention, is provided below.

U.S. Pat. No. 3,910,365, issued on Oct. 7, 1975 to Buchele, describes a device having an upper liquid chamber and a lower air chamber, with means provided for adjusting the air pressure in the lower chamber to compensate for tare weight. The Buchele device is not adaptable for use in motor vehicles, as such vehicles universally use multiple point suspension systems and a plurality of axles, rather than the single point attachments of the Buchele device. The present invention is adapted for use with motor vehicles, particularly trucks, having pneumatic or air suspension systems, and having a plurality of suspension points and axles in the suspension system.

U.S. Pat. No. 4,733,564, issued on Mar. 29, 1988 to Gorgé, describes a device comprising an aneroid chamber and spring loaded gear train to reduce or eliminate play and hysteresis in the mechanical movement. No suggestion is made of any means of calibrating the gauge to measure the weight supported by a pneumatic suspension system, as in the present invention.

U.S. Pat. No. 5,170,856, issued on Dec. 15, 1992 to Yang, describes a pair of hydraulic cylinders used to measure the force required to displace the hydraulic fluid therein, with some mechanical resistance being provided by a series of peripheral supports to the scale platform. The second cylinder bears against an electronic load cell or the like. No connection to a pneumatic suspension system is disclosed by Yang.

U.S. Pat. No. 5,179,856, issued on Jan. 19, 1993 to Huang, describes an electronic device to measure and display pressure sensed by a sensing element. While Huang states that the readout may provide an indication of pressure in different units, the exemplary units disclosed are pounds per square inch (PSI), kilograms per square centimeter, and bars (100 kN per square meter). Huang makes no suggestion of calibrating his gauge to measure the weight in pounds of an object supported by a pneumatic system, as provided by the present invention.

U.S. Pat. No. 5,349,866, issued on Sept. 27, 1994 to Huang, has a Bourdon tube or aneroid chamber used to move a lever against a piezoelectric resistor element. The variable electrical current is used to provide a digital display of the pressure. The particular structure of this gauge is irrelevant to the concept of the present invention, in which a gauge of any suitable type is used to display the pressure readout in weight from the pneumatic suspension of a truck or other motor vehicle. Huang makes no suggestion of calibrating his gauge to provide an indication of weight.

U.S. Pat. No. 5,391,843, issued on Feb. 21, 1995 to Sato et al., describes a complex electronic pressure and inclination sensing system. The pressure sensors are for use in pneumatic-hydraulic suspension cylinders, rather than in a strictly pneumatic suspension. Such pneumatic/hydraulic suspension devices also act as shock absorbers and include a pressurized gas, e. g. nitrogen, at the time of manufacture, with no significant weight being supported by the device, in order to provide some resilience for the device due to the otherwise incompressible hydraulic fluid. This preloading of the device makes any pressure measurement of a load supported thereby, inaccurate unless the preload is compensated for. The present load measuring system is adapted for use with purely pneumatic suspensions, and no such pressurized preload need be compensated for. Also, the present load measuring system is a strictly pneumatic and mechanical system, devoid of electronics. Thus, the present device and system is considerably more economical and easier to maintain than the electronic system of Sato et al.

U.S. Pat. No. 5,555,764, issued on Sept. 17, 1996 to Dybas, discloses a specially constructed base for a propane cylinder, with the base including a pressure gauge installed integrally therewith and communicating with a central chamber in which the pressure varies depending upon the weight of the overlying propane tank or cylinder. Dybas describes the gauge as being calibrated to indicate the weight of the cylinder, but the Dybas device cannot be used to measure the weight of a motor vehicle with its numerous pneumatic suspension springs, due to its integration into a single pneumatic component. Also, Dybas does not disclose marking his gauge with any limits, nor any visible or audible annunciator for a predetermined limit.

U.S. Pat. No. 4,854,407, issued Aug. 8, 1989 to Wagner, discloses a system for registering the load distribution of a trailer over the front, drive and trailer axles with respect to the fifth wheel disposition and an established total air pressure in the system. Supplemental dials are adjusted to align an estimated weight with the total air pressure reading thereby giving the operator a pressure related estimate of the loads carried on each axle. Wagner does not discloses a pointer adjustment in order to accurately calibrate the gauge to a known weight quantity.

U.S. Pat. No. 4,832,141, issued May 23, 1989 to Perini et al., discloses a vehicle mounted load indicator having a displacement detecting unit for monitoring the change in distance between a vehicle axle and the load platform. Upon sensing a change in displacement, the air pressure is adjusted so as to return to the original distance. Perini et al. does not discloses a method to adjust a gauge pointer in order to accurately calibrate the gauge to a known weight quantity.

U.S. Pat. No. 4,792,004, issued Dec. 20, 1988 to Sheffield, discloses a pressure gauge for use on farm equipment to measure the pressure in the hydraulic system of the equipment. The operator must perform a mathematical algorithm in order to determine the weight of a payload. Sheffield does not disclose a method to adjust a gauge pointer in order to accurately calibrate the gauge to a known weight quantity.

U.S. Pat. No. 5,844,474, issued Dec. 1, 1998 to Saling et al., discloses an overload alarm attached to a vehicle suspension unit. The overload alarm includes a limit switch which actuates a visual and audible indication upon the detection of an excessive weight on the vehicle. Saling et al. does not discloses a pointer adjustment in order to accurately calibrate the gauge to a known weight quantity, nor does Saling et al. disclose a method to adjust a gauge pointer in order to accurately calibrate the gauge to a known weight quantity.

None of the above inventions and patents, either singly or in combination, is seen to describe the instant invention as claimed.

SUMMARY OF THE INVENTION

The present invention comprises a pneumatic load measuring device for vehicles having pneumatic or air suspension systems. The device comprises an analog or dial type pneumatic or electric pressure gauge, but rather than indicating pressure values or units, the gauge is calibrated to directly read the weight supported by the pneumatic suspension system of the vehicle. The present gauge is preferably installed within the cab of the vehicle, where it is visible to the vehicle operator, and is connected to the pneumatic pressure line between the vehicle air compressor and the pneumatic suspension system of the vehicle. The electric embodiment of the present invention includes a transducer in communication with the pneumatic suspension system for converting the pneumatic pressure into an electrical signal. The electrical signal is transmitted to the electric gauge which is calibrated to indicate weight.

The gauge may be calibrated to indicate the weight in pounds, or calibrated to indicate the weight using the metric system. The weight scale of the gauge may be marked to indicate the maximum allowable weight, if so desired.

An alternative embodiment of the present invention provides an adjustable scale to indicate the weight of the cargo aboard the vehicle. This adjustable scale may be positioned with its zero point opposite the empty weight of the vehicle, so the indicator hand or pointer simultaneously shows both the cargo weight and the total weight of the cargo and vehicle. A visible and/or audible annunciator or alarm may be provided to alert the vehicle operator when the maximum allowable total weight of the vehicle has been reached. The present device is particularly well suited for installation in large semi trucks having pneumatic suspension systems for the trailer axle group and tractor drive wheel axle group, but may be adapted for other air suspension vehicles as well.

Accordingly, it is a principal object of the invention to provide an improved pneumatic load measuring device including pneumatic analog pressure gauge means calibrated to indicate the weight of a motor vehicle in which the gauge is installed.

It is another object of the invention to provide an improved load measuring device which gauge means is installed in the cab of the motor vehicle, and is connected to the pneumatic suspension system downstream of the air compressor for the system.

It is a further object of the invention to provide an improved pneumatic load measuring device which may be calibrated in pounds of weight, or which may be calibrated in the metric system.

An additional object of the invention is to provide an improved pneumatic load measuring device which may include markings and visible and/or audible annunciator means for indicating when the maximum allowable load has been reached.

Still another object of the invention is to provide an improved pneumatic load measuring device which may include an adjustable cargo scale having a zero point positionable opposite the empty weight of the vehicle, for simultaneously indicating the cargo weight and the total weight of the vehicle.

It is a further object of the invention to provide a load measuring device including an electric gauge for indicating the total and/or cargo load of the vehicle.

It is still yet another object of the invention to provide a method of setting and calibrating the load measuring device.

It is an object of the invention to provide improved elements and arrangements thereof in an apparatus for the purposes described which is inexpensive, dependable and fully effective in accomplishing its intended purposes.

These and other objects of the present invention will be apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a pneumatic load measuring device for vehicles having pneumatic suspension systems. While the present invention is adaptable to any type of vehicle having a pneumatic or air inflated suspension system, it is particularly well suited for use on trucks and the like which often employ such suspension systems. This is particularly true in the case of tractor and semi-trailer truck rigs, or "eighteen wheelers," where the trailer suspension is typically a pneumatic system, and the rear or drive wheel suspension of the truck tractor also often uses a pneumatic suspension system.

Such suspension systems are conventionally inflated by an air compressor powered by the engine of the truck, which supplies pressurized air to the various pneumatic suspension units of the suspension system. A pneumatic line extends from the compressor to the pneumatic system for the rear or drive wheel axles of the truck tractor, with an additional pneumatic line extending to the pneumatic suspension system supporting the rear of the trailer above the trailer wheels.

A level arm is conventionally provided in the system, in order to adjust and distribute the pressure between the forward (truck tractor) and rearward (trailer) pneumatic suspension systems when the load being carried by the trailer is not evenly distributed between the front and rear of the trailer. Thus, when a greater load is placed to the front of the trailer than to the rear of the trailer, the front of the trailer will cause the tractor drive wheel air suspension to be compressed to a greater degree than the trailer rear suspension. The level arm senses this lower position of the front of the trailer, and redistributes the pneumatic pressure to inflate the tractor air suspension to a greater pressure than the trailer rear suspension. The level arm is also used in vehicles such as vans, which have only a single pneumatically suspended axle group at the rear or cargo carrying end of the vehicle. The level arm automatically increases the pressure in the pneumatic system as weight is added to the cargo box of the van, in order to keep the vehicle level. The level arm may also provide this function in a tractor and trailer rig.

All of the above described structure comprising an air suspension system for semi trucks and trailers, and level arm apparatus for adjusting the relative pressures between the tractor and trailer pneumatic suspensions and thereby leveling the trailer, is conventional. However, none of the above structure permits the truck or vehicle operator to determine the weight being carried.

Figure 1:
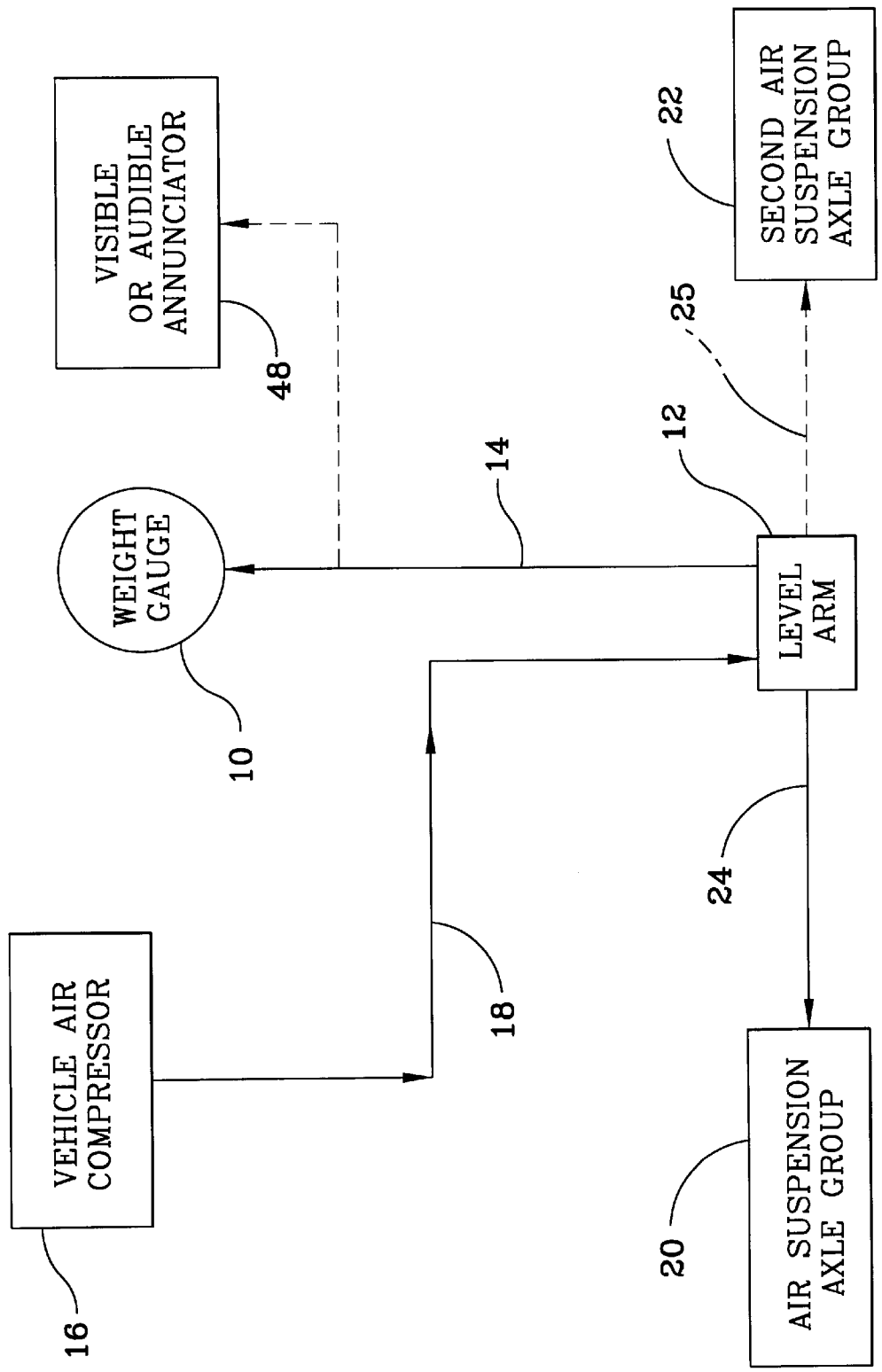
FIG. 1 is a schematic diagram of the various components of a motor vehicle pneumatic suspension system and the present invention, and their relationship to one another.

Accordingly, the present invention provides a gauge 10 which may be incorporated into the pneumatic system of the motor vehicle, generally as shown in the schematic layout of FIG. 1. The gauge 10 is remotely located from the remainder of the pneumatic system, preferably installed in the cab of the truck or truck tractor, in or near the conventional instrument panel of such a vehicle. The gauge 10 connects to the pneumatic suspension system, preferably receiving pressure signals from the level arm 12 of the system by a gauge line 14. The level arm 12 receives pneumatic pressure from the air compressor 16 conventionally located with the truck tractor, by a pressure line 18 extending from the compressor 16 to the pneumatic suspension axle group 20, or more preferably to the level arm 12 controlling the pneumatic pressure for the pneumatic suspension 20. In the case of a truck tractor and semi trailer, the tractor will have a first air suspension axle group 20 while the trailer is equipped with a second air suspension axle group 22, each comprising one or more pneumatic springs disposed between each drive axle and the frame on each side of the truck. The level arm 12 supplies pneumatic pressure to these two axle groups 20 and 22, respectively by first and second pneumatic lines 24 and 25.

In any event, whether the vehicle is equipped with a single air suspension axle group 20 or first and second air suspension axle groups 20 and 22, it will be seen that the present vehicle weight gauge 10 is connected at the level arm 12 which distributes pneumatic pressure to the axle group(s) 20 (and 22). Thus, the pressure gauge 10 measures the pressure distributed by the level arm 12 to the first (and second) axle group(s) 20 (and 22), to determine the total load placed on that axle group(s).

Figure 2:
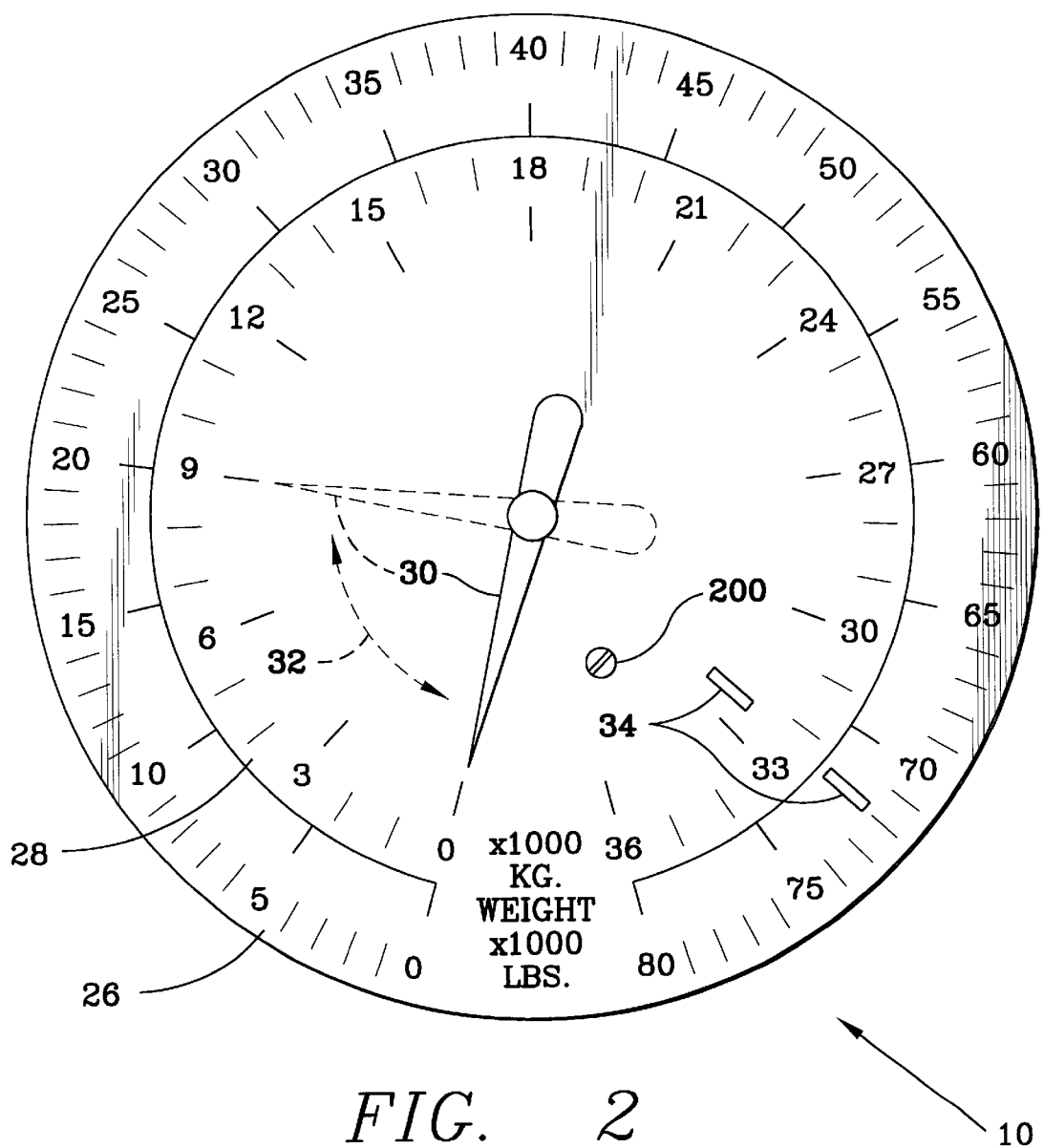
FIG. 2 is a plan view of the face of a pneumatic pressure instrument of the present invention.

FIG. 2 illustrates a view of the face of the present weight gauge 10. As weight is a force and pressure is a force per unit of area, the present gauge 10 is well suited for measuring the force provided by the weight of the vehicle due to gravity, as that weight or force compresses the pneumatic suspensions of the axle groups 20 and 22 to produce a pressure, or force per unit area, therein. As the total pressurized area remains constant and independent of the load imposed thereon, it will be seen that the pressure varies directly as the weight, allowing a pneumatic pressure gauge to be calibrated in units of weight in accordance with the present invention. By calibrating the face of the gauge 10 in units of weight, rather than in units of pneumatic pressure, the gauge 10 may be used to determine the weight of the motor vehicle in which it is installed according to FIG. 1. The greater the weight, the greater the pressure which will be developed in the pneumatic suspension system, with the gauge 10 providing an indication of the weight corresponding to the pressure in the system.

Preferably, the gauge 10 includes at least one scale 26 calibrated in pounds of weight, as in the outermost scale 26 of FIG. 2. However, a second scale 28 may be provided to display the weight in metric units, e. g., kilograms, if so desired. Other weight or mass units and divisions may be used as desired.

Preferably, the present gauge 10 is an analog gauge, as shown, having an indicator pointer or needle 30 which swings around the dial to indicate the weight of the vehicle as the weight, and corresponding pneumatic suspension pressure, is increased, as indicated by the arcuate movement arrow 32. However, other gauge configurations may be used as desired, such as digital readouts, etc. The present gauge 10 and system is advantageous in that no electrical power is required for its operation (perhaps excepting any annunciator means, as described further below), unlike such digital electronic devices and their associated pressure transducers.

Trucks and most commercial vehicles are limited as to their total or maximum gross weight, depending upon the specific type of vehicle, jurisdiction, etc. As an example for a tractor and semi-trailer, this maximum allowable weight may be on the order of 72,000 pounds, or about 32,700 kilograms. Accordingly, the present gauge 10 may be provided with a line 34 or other suitable indication to indicate the maximum allowable gross weight for that particular vehicle in which the present gauge is installed. This indicator 34 may be in the form of an adjustable "bug" which may be repositioned as required about the periphery of the gauge 10 as required, for different maximum allowable gross weights in different jurisdictions and under different circumstances. The maximum gross weight indicator may be in the form of a radial line across each of the two scales 26 and 28, as shown, or may alternatively comprise a single radial line across both scales.

Figure 3:
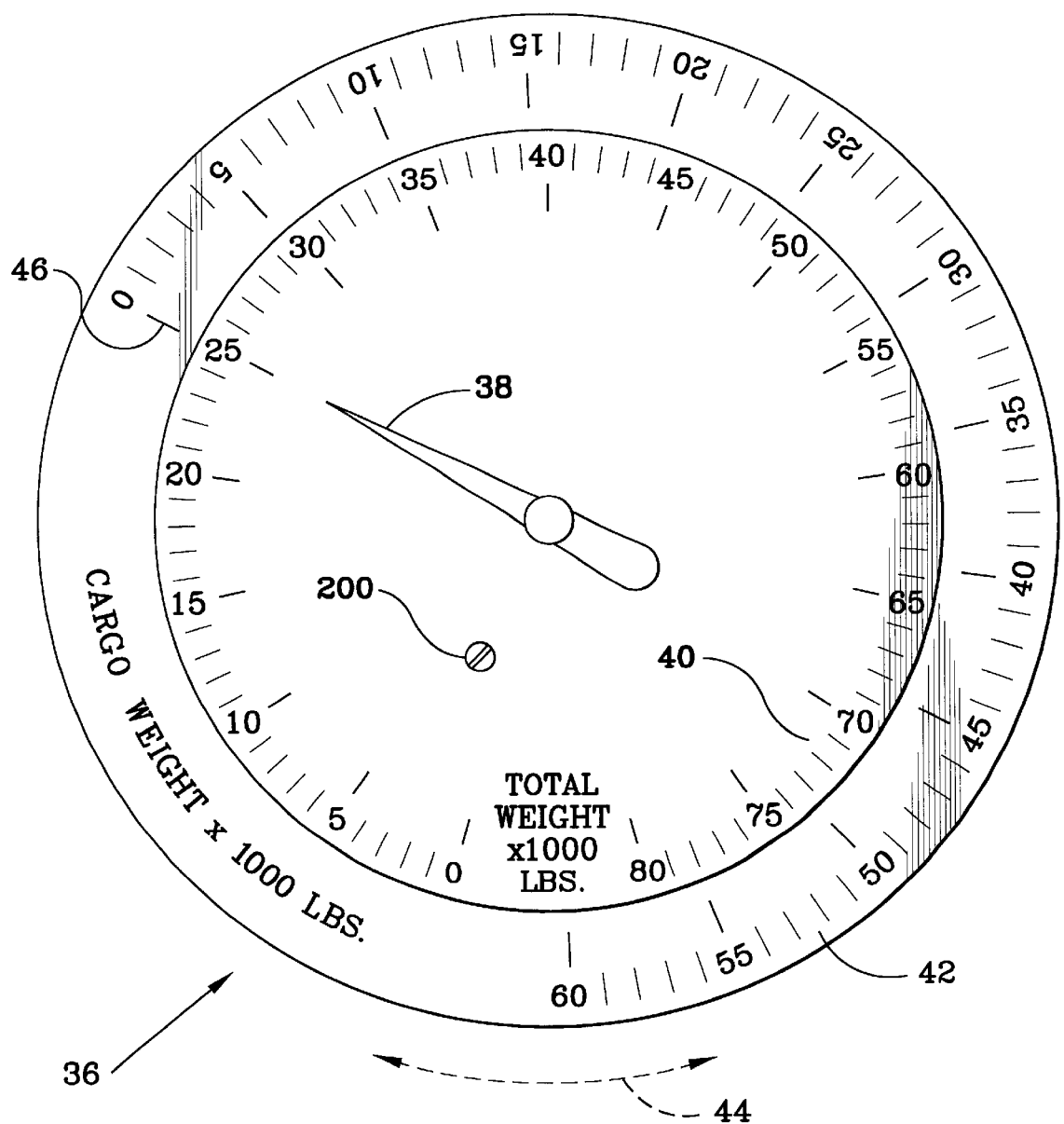
FIG. 3 is a plan view of an alternative embodiment of the instrument face of the present invention, having an adjustable scale for the weight of cargo or freight.

FIG. 3 discloses an alternative embodiment of the present weight gauge, designated by the reference character 36. The weight gauge 36 of FIG. 3 is an analog unit with a centrally located, revolving indicator hand or pointer 38, as in the gauge 10 of FIG. 2. A fixed, immovable weight scale 40, indicating the total gross weight of the vehicle, is provided about the circumference of the gauge 36. This scale 40 may be calibrated in pounds of weight, as shown, or alternatively some other units may be used, or even a dual scale configuration as shown in FIG. 2.

However, the gauge 36 of FIG. 3 also includes a movable rotary secondary scale 42 disposed about the circumference thereof, the movement of which is indicated by the scale movement arrow 44. The inner, fixed scale 40 may be calibrated to indicate the total gross weight of the vehicle, while the movable outer scale 42 may be calibrated to indicate the weight of any cargo or freight loaded aboard the vehicle. The movable outer scale 42 may be adjusted with its zero point or ordinate 46 aligned with the weight of the empty vehicle on the fixed inner scale 42, e. g., 25,000 pounds, as shown in FIG. 3. Thus, any weight added to the vehicle will cause the pointer 38 to rotate clockwise about the dial, and simultaneously point to a position on the inner scale 40 indicating the total gross weight of the vehicle and its cargo or freight, and to a position on the movable outer scale 42 indicating the weight of the cargo or freight alone. The movable scale 42 may be adjusted as required for different trailers or for other factors which affect the unladen weight of the vehicle.

Figure 4A:
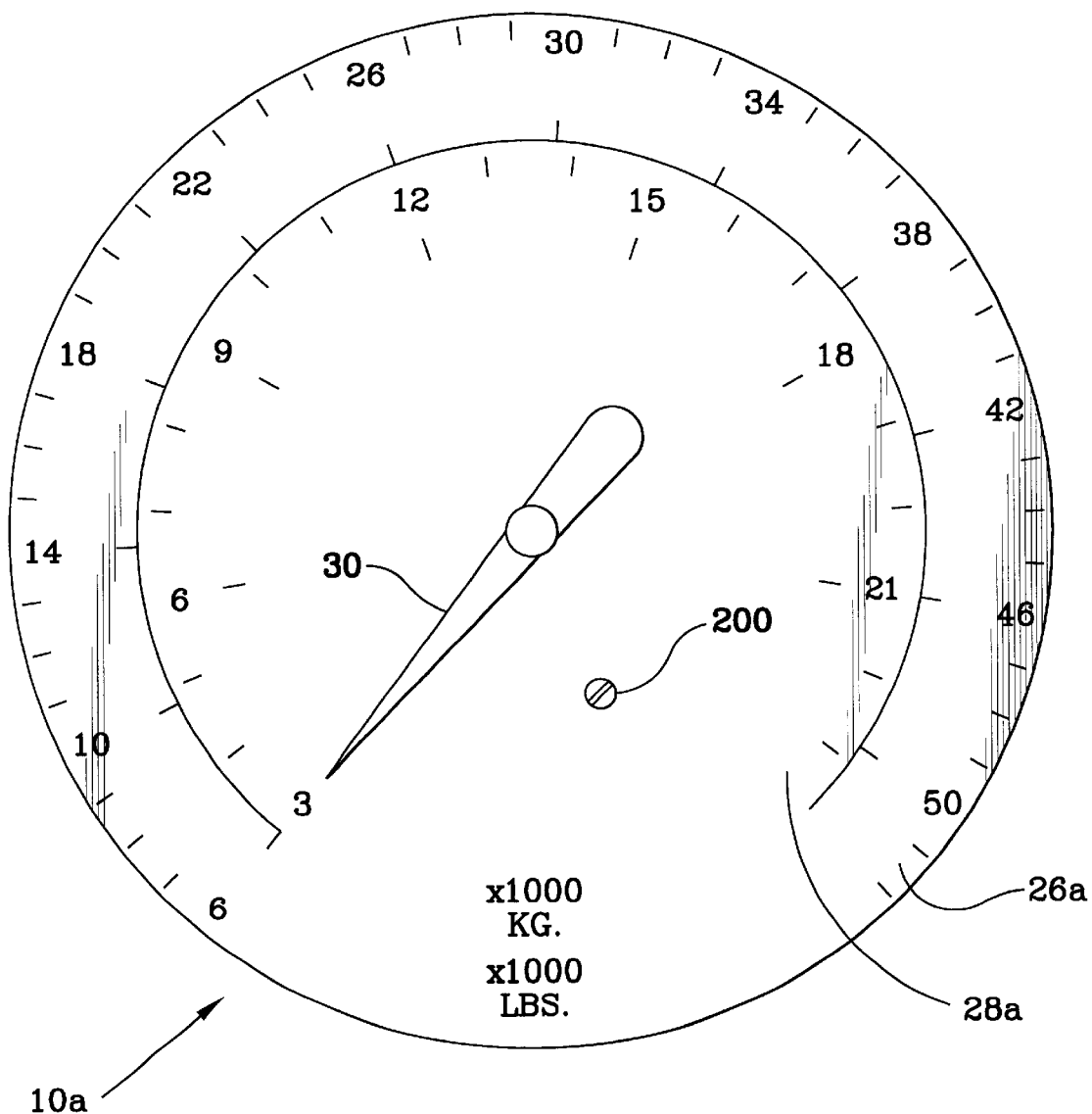
FIG. 4A is a plan view of another alternative instrument face embodiment.
Figure 4B:
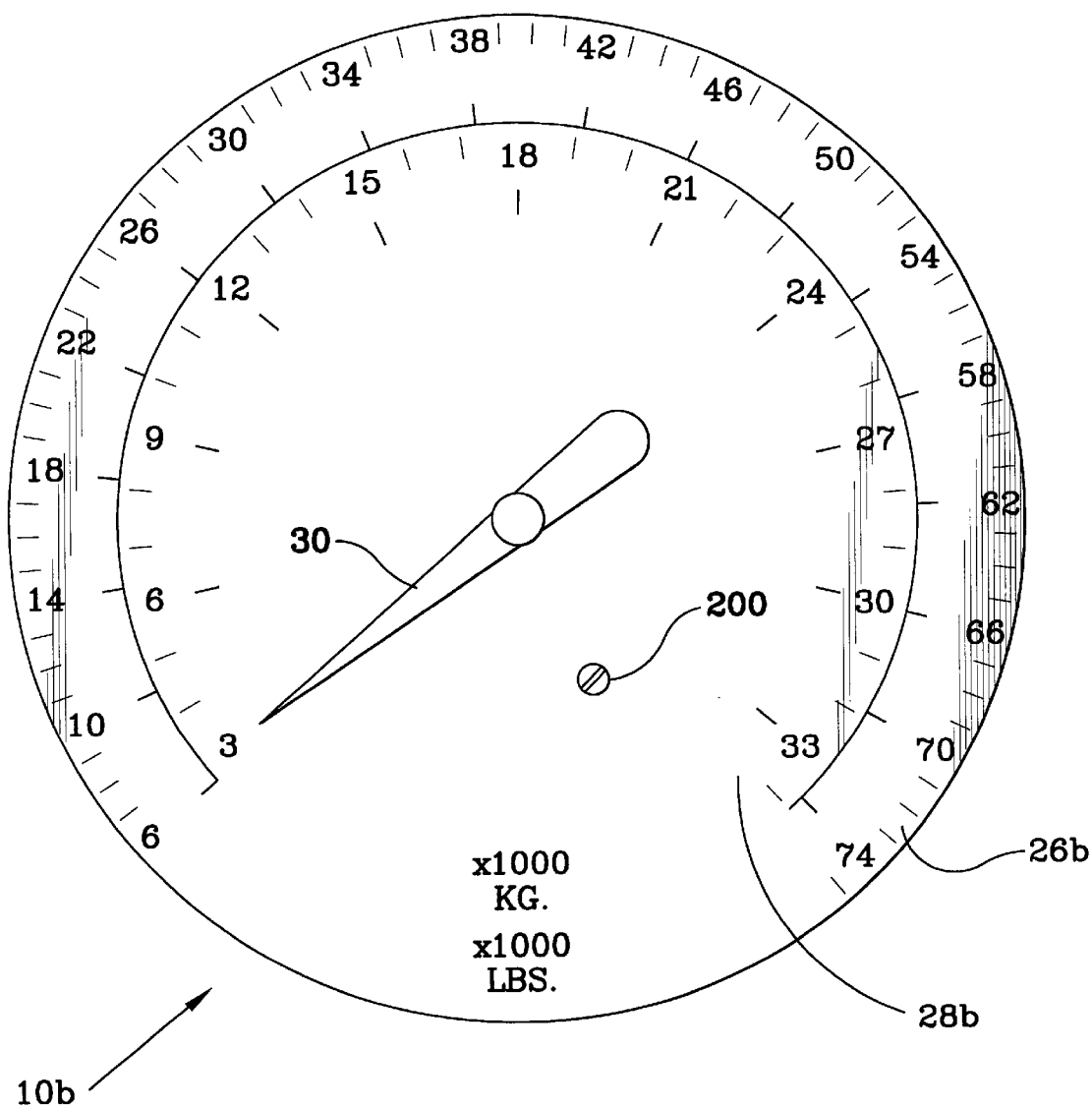
FIG. 4B is a plan view of yet another alternative instrument face embodiment.

It will be seen that different scales or calibrations of vehicle weight indicator gauges may be provided in accordance with the present invention. FIGS. 4A and 4B respectively illustrate two different gauges, respectively 10*a* and 10*b,* having features similar to the gauge 10 of FIG. 2. However, the outer scale 26*a* of the gauge 10*a* has a maximum value of only 52,000 pounds, while the inner scale 28*a* has a maximum value of about 23,000 kilograms. Vehicles having a greater maximum allowable weight might use the gauge 10*b* of FIG. 4B, in which the outer scale 26*b* has a maximum value of 75,000 pounds and the inner scale 28*b* a maximum value of 34,000 kilograms. Other maximum values, e. g., 48,000, 52,000, 56,000 pounds, etc., may be provided on gauge faces used in the present invention as desired, depending upon the maximum allowable weight of the motor vehicle with which the present pneumatic load measurement system is to be used.

The present system of measuring the weight of a vehicle according to the pressure developed in the pneumatic suspension system of the vehicle, also lends itself to the provision of an annunciator device which may be incorporated in the system to alert the operator of any overweight condition which may occur. Figure discloses the installation of such a visible (e. g., warning light) or audible (e. g., buzzer, horn, etc., preferably distinguishable from the low air pressure buzzer for the air brake) annunciator device 48, which may be installed in the system to communicate with the pneumatic line 14 between the level arm 12 and the gauge 10. The annunciator 48 is preferably adjustable for different weights or pressures to match the specific maximum allowable gross weight of the specific vehicle, so the warning signal is not actuated below that maximum allowable gross weight. A conventional fixed or adjustable pressure transducer, similar to those used for the air brake low pressure warning signal but sending a signal due to a maximum predetermined pressure rather than a minimum pressure, as in the case of air brake warning systems, may be used to provide the visual or audible maximum weight signal.

The weight gauge 10 or 36 is easily installed in a truck or other vehicle having a pneumatic suspension system, by connecting to the existing level arm 12. The tractor of a semi trailer rig will typically have a relatively invariable weight (excepting empty or full fuel tanks, and other relatively minor weight differences), with most of the variation in weight being provided by the specific trailer being towed, and the cargo or freight (if any) therein. As the trailer is loaded, very little, if any, change will occur in the weight of the truck tractor resting upon the front axle of the tractor. Almost all of the change will be due to the loading of the trailer, and will be seen in the pneumatic suspension of the drive wheels of the tractor and in the trailer wheels.

Accordingly, the hand or pointer 30 or 38 of the respective gauges 10 or 36, may be preset to indicate the unladen weight of the truck tractor and any trailer being towed thereby, if so desired. Such an unladen weight setting is indicated by the pointer or hand 30 shown in broken lines in FIG. 2, or by means of the movable cargo weight scale 42 of the gauge 36 of FIG. 3. In this manner, no arithmetic subtraction of the empty weight of the vehicle need be made in order to arrive at the allowable weight of any freight to be carried. It is only necessary to load the truck trailer as desired, while periodically checking the gauge 10 or 36 (as applicable) to note the position of the respective pointer or hand 30 or 38, relative to the maximum allowable weight for the truck and trailer assembly.

In order to properly read the vehicle and/or cargo load weight from gauge 10, a method to install and calibrate the load measuring device is set forth as follows. A vehicle such as a semi truck or trailer has a weight that remains virtually constant throughout the life of the vehicle. The gauge 10 is installed on the vehicle in an appropriate place, such as the cab, for easy viewing of the face of the gauge 10. The appropriate connections are made between the level arm 12 and gauge 10 via the pneumatic line 14. Specifically, one or more of the air bags of the suspension system are deflated.

The air line to the bag is removed, and a pneumatic tee (not shown) is inserted therein. The air line is then attached to the tee, and pneumatic line 14 is coupled to the third port of the tee. If an audible or visual annunciator 48 is used, then the additional coupling is made via pneumatic line 14 and annunciator 48. The operator of the vehicle receives a cargo of known weight into the vehicle. The vehicle is transported to a level ground surface, and is brought to rest. With the brakes off, the transparent face cover 54 is removed, and the adjustment screw head 200 is turned clockwise or counterclockwise until the gauge 10 reads the known weight quantity. The transparent face cover 54 is replaced, and the now calibrated gauge 10 will continuously display the correct weight of the vehicle and any subsequent load amounts. It is important to note that re-calibration of the load measuring device is virtually unnecessary however, if it is needed to re-calibrate the load measuring device the simple steps are repeated.

In summary, the present weight gauge embodiments will provide a significant reduction in workload and worry for operators of large freight vehicles, such as trucks and semi trailers. The ease of installation and calibration, and the relatively low cost associated with the present gauge embodiments, will pay for themselves very quickly in terms of fines and penalties avoided. The loading of a truck incorporating one of the present weight gauges will be greatly simplified, and the present gauges also provide verification of the weight shown in the documentation accompanying the freight, to check the accuracy of such bills of lading and the like. This use alone will serve to reduce potential lost billings due to undercharges, thus proving the value of the present invention even further.

Figure 5:
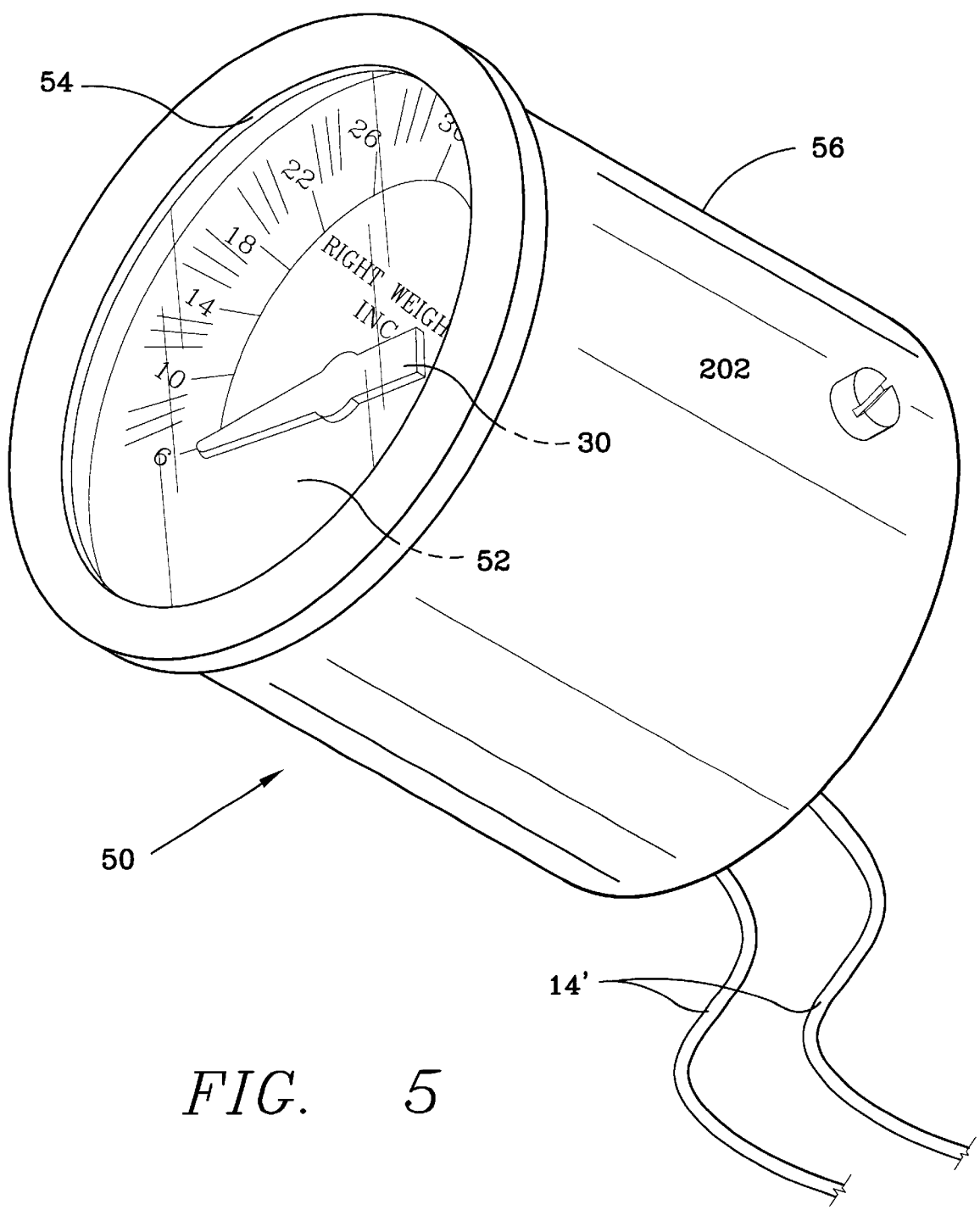
FIG. 5 is a perspective view of an alternative preferred embodiment of the present invention showing an electric gauge.

FIG. 5 shows an electric gauge 50 for reading the load carried by a vehicle, such as a tractor trailer. The electric gauge 50 includes a housing having a side wall 56. The sidewall 56 is shown as being generally cylindrical, however, any configuration of the housing shape would be suitable. Electric gauge 50 further includes a transparent face cover 54 over graduated scale 52 and a pointer 30. Disposed on the sidewall 56 of the housing is a screw head 202 for calibrating the gauge 50 to the load borne on the vehicle. The electric gauge 50 may be substituted for the weight gauge 10 shown in FIG. 1. The pneumatic line 14 (FIG. 1) is replaced with an electrical communication link 14' (FIG. 5) between the level arm 12 and electric gauge 50. The level arm 12 includes a transducer (not shown), such as an LVDT, piezo-electric, capacitive, or the like, for converting the pneumatic line pressure into an electrical signal carried across electrical communication link 14 to the electric gauge 50. In this embodiment, the calibration of the gauge 50 to read the actual weight borne on the vehicle is carried out in a manner similar to the calibration procedure described hereinabove. Upon establishing the vehicle weight with a known load, the screw head 202 in side wall 56 is rotated to match the gauge pointer 30 reading with the established weight, thus calibrating the gauge 50. Once calibrated, the gauge 50 need not be calibrated again. However, if the need arises, a simple repeat of the calibration method is all that is necessary.

Figure 6:
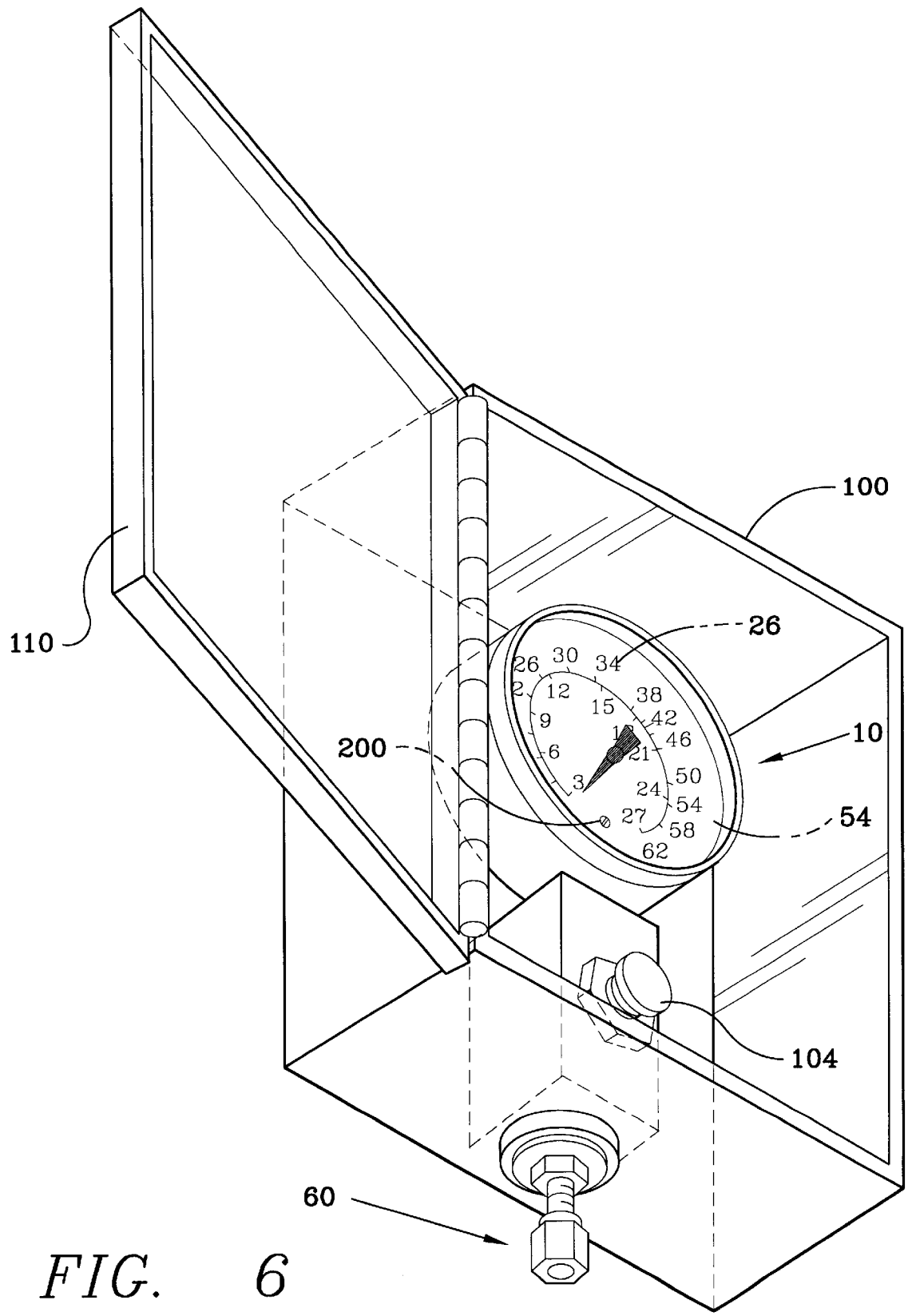
FIG. 6 is a perspective view of a case and gauge for mounting in a vehicle of the present invention.

FIG. 6 shows a load measuring gauge 10 having a casing 100, having a door 110, couplings 60 for adapting the gauge 10 to the pneumatic line 14 and correspondingly to the suspension system of a vehicle. The gauge 10 includes a removable, transparent face cover 54, a pointer 30, a graduated scale 26 and a screw head 200 for adjusting the calibration of the gauge 10. By removing the face cover 54, access to the screw head 200 for adjusting pointer 30 to accurately reflect the load borne on the vehicle. In addition, the casing 100 includes a relief valve 104 for reducing pressure within the load measuring device. The pressure reduction is necessary when a re-calibration of the gauge 10 is needed. The relief valve 104 is accessible through the door 110 of casing 100.

It is to be understood that the present invention is not limited to the embodiments described above, but encompasses any and all embodiments within the scope of the following claims.

I claim:

1. A combination motor vehicle and load measuring device for indicating the total weight of the motor vehicle, said combination comprising:

a motor vehicle having a cab and a pneumatic suspension system comprising at least one axle group with a pneumatic suspension therewith, an air compressor for inflating said pneumatic suspension, and a pneumatic line connecting said air compressor to said pneumatic suspension;

a casing mounted within said cab, said casing having a door hingedly attached thereto, and said casing including a pressure relief valve;

an analog pressure gauge installed within said casing;

said analog pressure gauge having a pointer, a graduated face, a transparent removable face cover, and means for positioning said pointer to calibrate said analog pressure gauge, wherein said pointer being calibrated for indicating the corresponding weight of said vehicle on said graduated face of gauge; and means for connecting said pressure gauge to said pneumatic suspension of said motor vehicle.

2. The motor vehicle and pneumatic load measuring device combination according to claim 1, said analog pressure gauge is chosen from the group consisting of a pneumatic gauge and an electric gauge.

3. The motor vehicle and pneumatic load measuring device combination according to claim 2, said pneumatic gauge including means for pneumatically coupling said gauge to the pneumatic suspension system of the vehicle.

4. The motor vehicle and pneumatic load measuring device combination according to claim 2, said electric gauge including means for electrically coupling said gauge to the pneumatic suspension system of the vehicle.

5. The motor vehicle and pneumatic load measuring device combination according to claim 1, including visual annunciator means for indicating when a predetermined weight of said vehicle has been reached.

6. The motor vehicle and pneumatic load measuring device combination according to claim 5, wherein said visual annunciator means is adjustable for different predetermined vehicle weights.

7. The motor vehicle and pneumatic load measuring device combination according to claim 1, including audible annunciator means for indicating when a predetermined weight of said vehicle has been reached.

8. The motor vehicle and pneumatic load measuring device combination according to claim 7, wherein said audible annunciator means is adjustable for different predetermined vehicle weights.

* * * * *